United States Patent [19]

Brown

[11] Patent Number: 5,542,025
[45] Date of Patent: Jul. 30, 1996

[54] PRECISION Z-INTERPOLATION METHOD AND APPARATUS

[75] Inventor: Andrew T. Brown, Fort Collins, Colo.

[73] Assignee: Hewlett-Packard Company, Palo Alto, Calif.

[21] Appl. No.: 641,976

[22] Filed: Jan. 16, 1991

[51] Int. Cl.⁶ .................................................. G06T 15/00
[52] U.S. Cl. ............................................................ 395/122
[58] Field of Search ................................... 395/121, 122, 395/119; 364/723; 340/728

[56] References Cited

U.S. PATENT DOCUMENTS 4,805,116  2/1989  Liang et al. ............................. 395/129
5,025,405  6/1991  Swanson .................................. 364/723

OTHER PUBLICATIONS

*Fundamentals of Interactive Computer Graphics*, Ch. 12, by J. D. Foley and A. Van Dam, ISBN: 0-201-14468-9, 1982.

Primary Examiner—Heather R. Herndon

[57] ABSTRACT

A precision Z-interpolator for use in an interactive graphics system multiplies the line slope by a value $f_S$ in computing the first Z ordinate value. This eliminates the offset error in Z inherent in previously known interpolators. For extremely large slopes, the slope is not used directly in the computations. Instead the value used is $(Z_E - Z_S)/(1 + f_E/f_S)$ (see FIG. 4).

6 Claims, 3 Drawing Sheets

PRECISION Z-INTERPOLATION METHOD AND APPARATUS

FIELD OF THE INVENTION

The present invention is related to the field of computer graphics. More particularly, the present invention is related to methods and apparatuses for interpolating Z ordinate values (or depth) in an interactive computer graphics system.

BACKGROUND OF THE INVENTION

The field of computer graphics concerns the creation, storage, manipulation and display of pictures and models of objects by a digital processor. Interactive computer graphics is the subclass of computer graphics in which a user dynamically controls the picture's content, format, size or color on a display surface by means of an interaction device such as a keyboard, lever or joystick. See *Fundamentals of Interactive Computer Graphics*, by J. D. Foley and A. Van Dam, ISBN: 0-201-14468-9. The creation of synthetic images (i.e., images which exist as abstract collections of lines, points, curves, etc., in the computer's memory) is the usual domain of interactive computer graphics. This is in contrast to the creation of images of real objects, which come directly or indirectly from a scanning device of some sort, e.g., a film scanner, TV scanner, ultrasound scanner, etc.

There are two primary classes of interactive computer graphics systems: random-scan and raster-scan systems. Images displayed by a random-scan system are encoded as commands to draw each output primitive (i.e., point, line or polygon) by plotting individual points or drawing connecting lines between specified starting and ending coordinates of line segments. Polygons are simply treated as a closed series of line segments. Encoding for a raster-scan system is much simpler: output primitives are broken up into their constituent points for display. The major difference between a simple point-plotting random-scan system and a raster-scan system is in the organization of the stored data used to drive the display. (As explained below, the data is stored in a frame buffer or refresh buffer.) In the random-scan display system, the component points of each successive output primitive are stored sequentially in memory and are plotted in that order, one point at a time. This is because the beam may be moved randomly on the screen. In the raster-scan display system, the refresh memory is arranged as a 2-dimensional array of data. The entry or value stored at a particular row and column encodes an intensity and/or color value of a corresponding display element on the screen. By convention, the location of each display element is specified by a unique (X,Y) coordinate. Z conventionally represents the depth ordinate.

Since each memory location defines a single point-sized element of an image, both the display screen location and its corresponding memory location are often called a "pixel," short for the image processing term "picture element." Hereinafter, to avoid confusion, the term "display pixel" is used to indicate picture elements of a display device, and "storage pixel" to indicate memory locations corresponding to the display pixels.

FIG. 1 is a simplified block diagram of a typical raster-scan graphic system. Such a system includes an image creation system 12, an image storage system 14 (such as a refresh buffer or frame buffer), an image display system 16, a raster display 18 and an interaction device 20. The image creation system 12 converts output primitives into the data stored in the refresh buffer or frame buffer of the image storage system 14. The instruction set processing speed of the image creation system 12 establishes most of the characteristics of the raster-scan system 10. Moreover, the image creation system 12 is particularly malleable because it is typically implemented with a microprocessor. See Chapter 12 of *Fundamentals of Interactive Computer Graphics*, referenced above.

In addition to the basic components enumerated above, there may also be a Z-interpolator for interpolating Z ordinate values (or Z values) of points along a line having a nonconstant depth, e.g., a segment of a three dimensional surface. As explained more fully below, a problem with known Z-interpolators is that they often lack sufficient precision to accurately determine which of two or more overlapping images to display. If the computed depth of a line is in error, a line that should not be displayed (a "hidden line") may be displayed, and a line that should be displayed may not. This hidden line problem is aggravated when the slope of one or more of the lines defining the surface becomes extremely large. The problem can be mitigated for large slopes by making the hardware (i.e., divider) used to compute the Z values more elaborate, but only at a significantly greater cost. Accordingly, an object of the present invention is to provide a method and corresponding apparatus for precisely interpolating Z ordinate values of lines to be displayed. A further object of the present invention is to provide such a method and apparatus while also ensuring that the divider used to calculate slope does not overflow when the slope becomes very large. The present invention achieves these goals.

SUMMARY OF THE INVENTION

The present invention provides an interpolation method for determining an ordinate value ($Z_i$) along a first axis (Z) intermediate between a starting ordinate value ($Z_S$) and an ending ordinate value ($Z_E$). The starting and ending ordinate values correspond to starting and ending ordinate values ($X_S$, $X_E$) along a second axis (X) perpendicular to the first axis. The starting and ending coordinates ($X_S$, $Z_S$), ($X_E$, $Z_E$) define starting and ending points, respectively, of a line of slope m to be displayed. The interpolation method includes the following steps:

First, defining a fractional starting value ($f_S$) equal to the difference between $X_S$ and a first integer value. Next, determining whether the slope is large. Finally, computing $Z_i$ in accordance with one of a plurality of predefined formulas, the formula selected as a function of the size of the slope. For example, $Z_i$ may be computed in accordance with the following equations: For small slope, $Z_i=Z_S+f_S m$, wherein $m=(Z_E-Z_S)/(X_E-X_S)$; or, for large slope, $Z_i=Z_S+(Z_E-Z_S)/(1+f_E/f_S)$, wherein $f_E$ defines a fractional ending value equal to the difference between $X_E$ and a second integer value. In a preferred embodiment, the fractional starting value ($f_S$) is equal to the difference between $X_S$ and the nearest integer larger than $X_S$.

In a preferred embodiment of the invention, a computer graphics system comprises an image creation system for generating lines to be displayed, a frame buffer for storing pixel values representative of the lines to be displayed, a display for displaying the pixel values, and an interpolator for interpolating ordinate values $Z_i$ intermediate between a starting ordinate value $Z_S$ and an ending ordinate value $Z_E$. The interpolator comprises means for carrying out the interpolation method recited above.

DETAILED DESCRIPTION OF THE PREFERRED EMBODIMENTS

Figure 1:
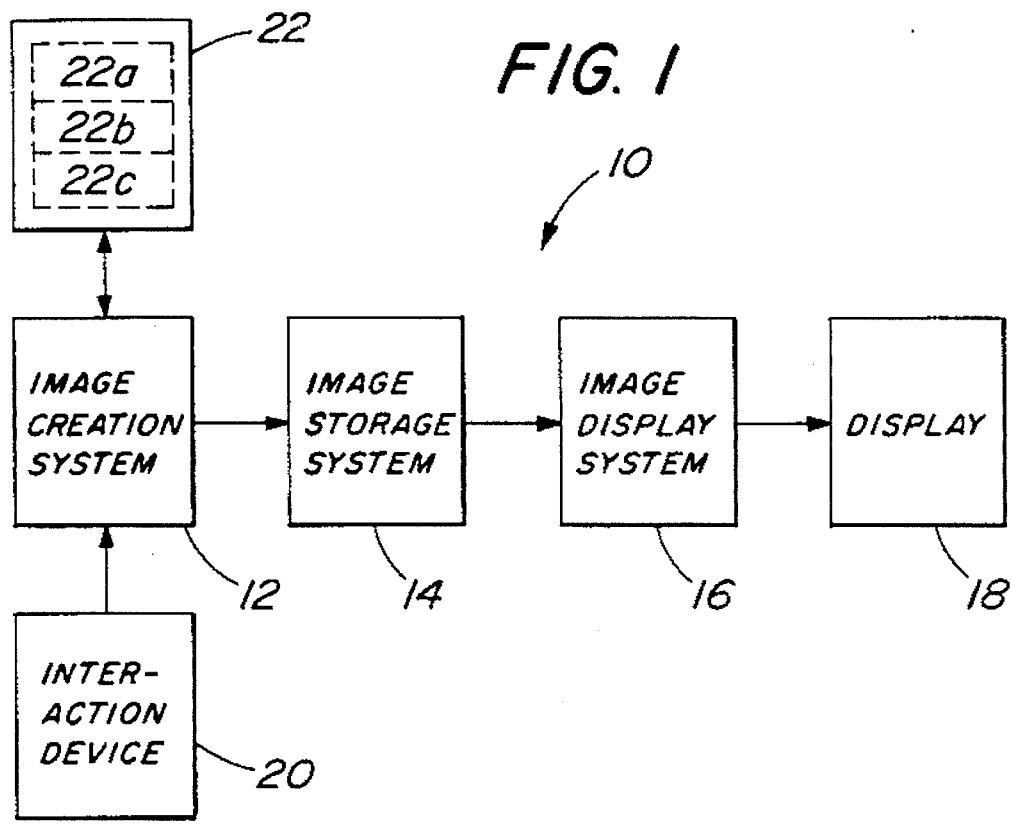
FIG. 1 is a simplified block diagram of an interactive computer graphics system in accordance with the present invention.

Referring to the drawings, an interactive graphics system 10 is shown in FIG. 1. The preferred embodiment of the graphics system 10 comprises an image creation system 12, a frame buffer (or image storage system) 14, an image display system 16, a raster-scan display 18, an interaction device 20 and a Z-board 22. In accordance with the present invention, a Z-board 22 comprises a Z-interpolator 22a, Z-buffer 22b and Z-comparator 22c.

Figure 2:
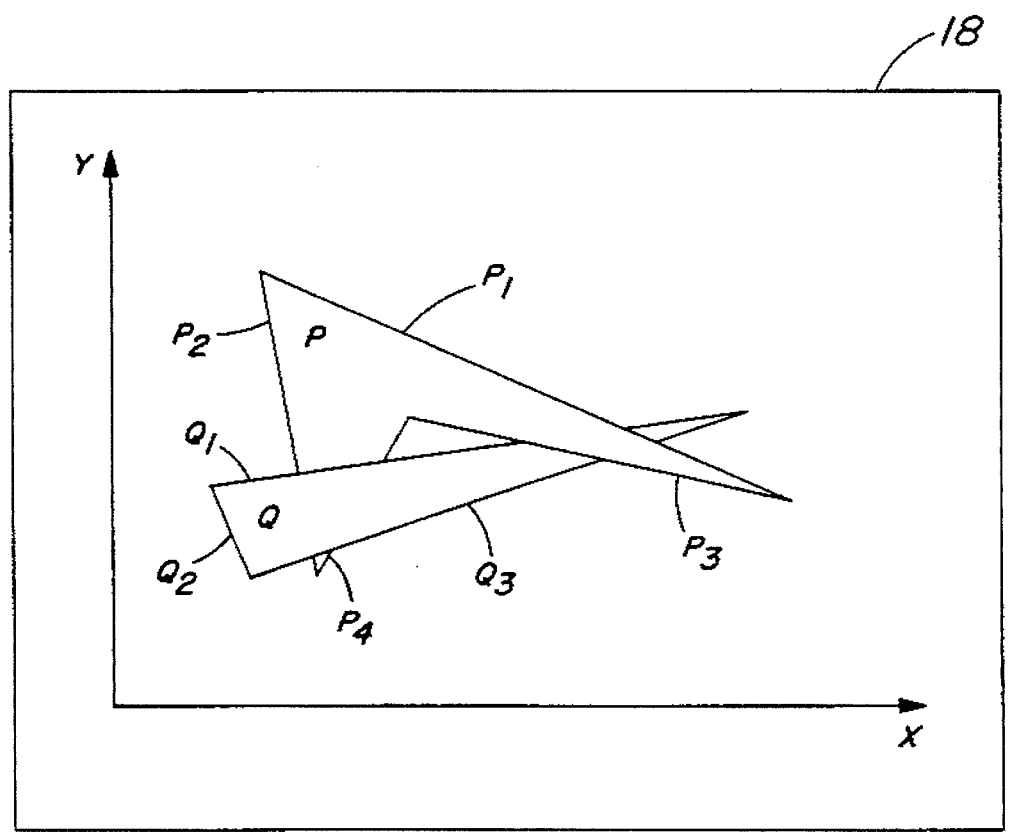
FIG. 2 is an example of two overlapping polygons displayed in accordance with the present invention.

According to the invention, when an image (e.g., a surface P defined by a polygon) is generated by the image creation system 12, pixel data defining the intensity and color of the corresponding display pixels representing the image are stored in the frame buffer 14. As discussed above, this pixel data is used by the image display system 16 to drive, or turn on, the respective display pixels of the raster-scan display 18. However, when the image creation system 12 generates two or more overlapping surfaces P, Q (see FIG. 2), the system must be able to precisely determine the depth, or Z value, of each point on the respective surfaces P, Q. Since each surface is defined by a polygon, and each polygon is defined by a sequence of line segments $P_1, P_2, P_3, \ldots, Q_1, Q_2, Q_3$, it is critical that the system 10 be able to precisely interpolate Z values of points between starting and ending points of each line segment $P_1$, $P_2$, etc. This interpolation is required because each line segment is defined by its starting and ending coordinates (designated hereinafter $(X_S, Y_S, Z_S)$, $(X_E, Y_E, Z_E)$ respectively).

According to the Z-buffer hidden surface algorithm, each element of the Z-buffer is initialized with the maximum Z value to be displayed (this assumes that decreasing Z moves the image closer to the viewer). Similarly, each element of frame buffer 14 is initialized to a predefined value, e.g., the background color. Then, before the frame buffer 14 is loaded with pixel data, the Z value corresponding to each storage pixel is compared to the corresponding value stored in the Z-buffer (there is a Z-buffer element for each frame buffer storage pixel and display pixel). If a computed Z value for a particular pixel is less than the value stored in its corresponding Z-buffer element, the computed value is placed in the Z-buffer. In addition, the corresponding pixel value defining the color and intensity of the display pixel is stored in the frame buffer 14 element for that pixel. Thus, as long as the Z values are correctly interpolated, hidden lines are not displayed.

Figure 3:
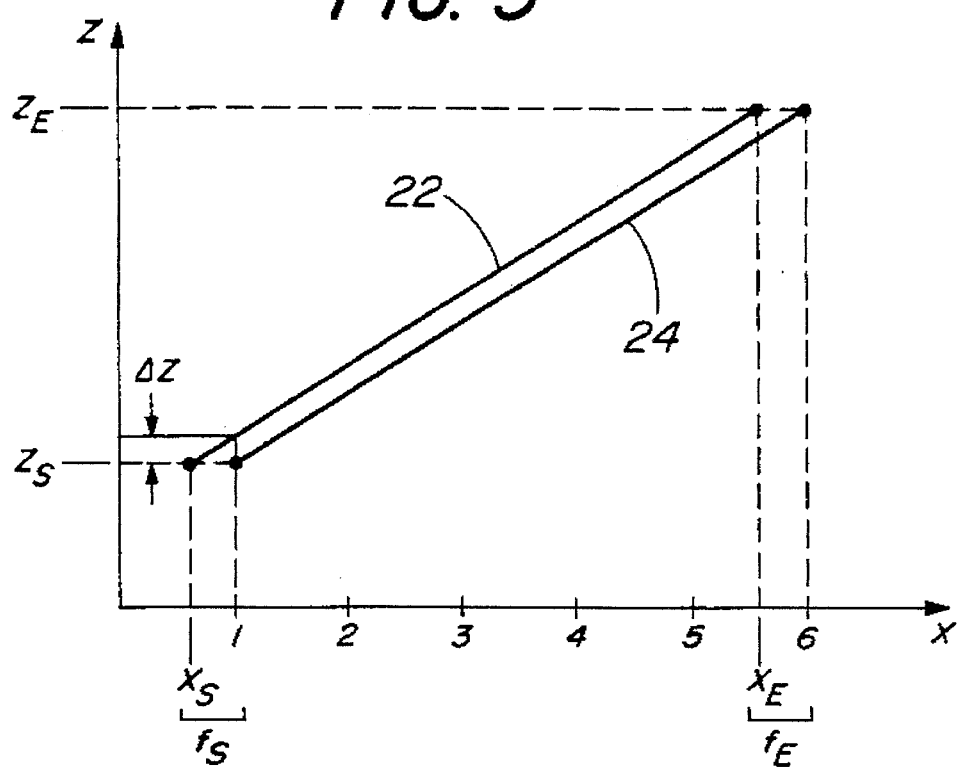
FIG. 3 is an illustration of exemplary lines used to explain an interpolation method provided by the present invention.

Referring now to FIG. 3, an interpolation method according to the present invention will now be described. As an illustration, a line whose Z ordinate values are being interpolated lies in the X-Z plane, i.e., Y is constant. (Note that any line can be defined in terms of its starting and ending coordinates along a pair of orthogonal axes.)

FIG. 3 shows two lines in the X-Z plane. Let line 22 be the desired line, i.e., the line to be displayed. The coordinates of its starting and ending points are $(X_S=0.8, Z_S=8)$ and $(X_S=5.3, Z_E=27)$, respectively. Thus, the slope m of line 22 is given by $$m = \frac{(Z_E - Z_S)}{(X_E - X_S)} = \frac{(27-8)}{(5.3 - 0.8)} = 4.222\ldots$$

In order to display this line on a real display with a limited number of discrete display pixels, while ensuring that hidden lines or portions thereof are not displayed, it is necessary to compute Z values corresponding to each integer value of X between $X_S$ and $X_E$.

Formerly, in the prior art, the respective Z values $Z_1, Z_2, \ldots Z_6$ corresponding to $X=1, 2, \ldots 6$, were evaluated by setting $Z_1$ equal to $Z_S$ (the ideal starting value) and incrementing by m for each successive point. This method would yield the following values of Z:

| | | | | |
|---|---|---|---|---|
| $Z_1$ | = | $Z_S$ | = | 8 |
| $Z_2$ | = | $Z_1 + m$ | = | 12.222... |
| $Z_3$ | = | $Z_2 + m$ | = | 16.444... |
| $Z_4$ | = | $Z_3 + m$ | = | 20.666... |
| $Z_5$ | = | $Z_4 + m$ | = | 24.888... |
| $Z_6$ | = | $Z_5 + m$ | = | 29.111... |

The above values of Z lie along line 24 of FIG. 3. It can be seen that the line actually displayed (line 24) is offset from the desired line (line 22) by an amount $f_S = 1 - X_S$ in the X-direction and $\Delta Z = f_S m$ in the Z-direction. Since $\Delta Z$ is a function of the slope m, the $\Delta Z$ component of the offset error can become quite large as the slope m becomes large.

One of the objects of the present invention is to provide a Z-interpolator that eliminates the aforementioned error in Z. There is an additional problem, however, in the above prior art interpolation method: as the slope m becomes extremely large the divider will eventually overflow, thus rounding down of the number occurs, which results in additional error. (E.g., a 32-bit divider having one sign bit, 15 integer bits and 16 decimal bits will overflow when m is greater than 32,768. Accordingly, a further object of the present invention is to provide an interpolator that will not overflow the divider when m is extremely large.

According to the invention, the known interpolation method described above is modified for small m, by multiplying the slope m by $f_S$ in computing the first Z value $Z_1$. This eliminates the $\Delta Z$ component of the offset error provided by the previously described prior art interpolation method. Thus, according to the invention the interpolated Z values corresponding to $X_1, X_2, \ldots X_6$, are:

| | | | | |
|---|---|---|---|---|
| $Z_1$ | = | $Z_S + f_S m$ | = | 8.8444... |
| $Z_2$ | = | $Z_1 + m$ | = | 13.0666... |
| $Z_3$ | = | $Z_2 + m$ | = | 17.2888... |
| $Z_4$ | = | $Z_3 + m$ | = | 21.5111... |
| $Z_5$ | = | $Z_4 + m$ | = | 25.7333... |
| $Z_6$ | = | $Z_5 + m$ | = | 29.9555... |

Figure 4:
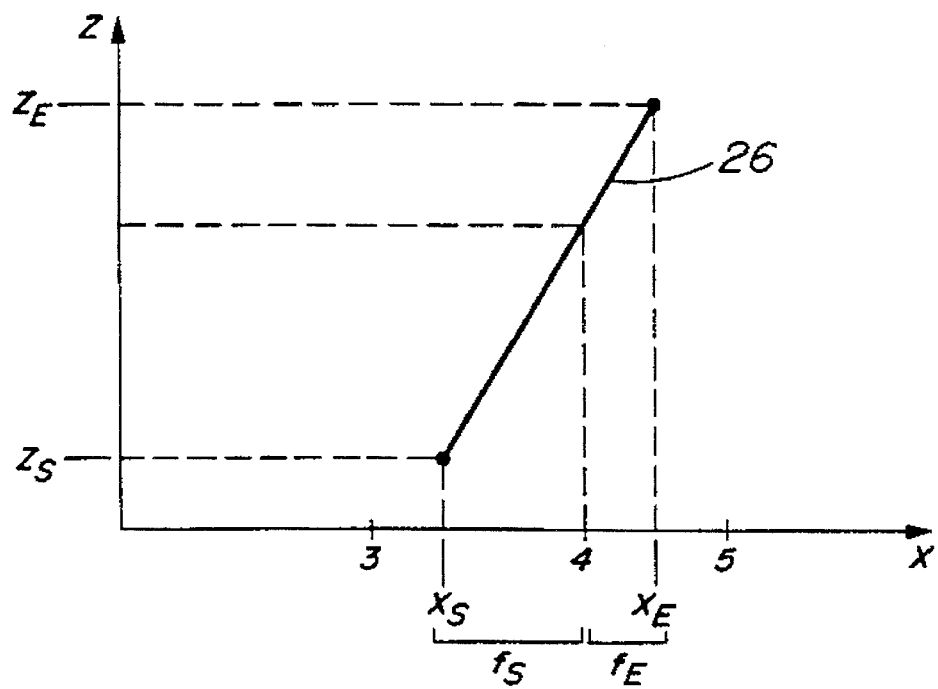
FIG. 4 is an illustration of an exemplary line of large slope used to explain the interpolation method provided by the present invention.

For extremely large m, where there is a risk that the divider will overflow, consider the exemplary line 26 shown in FIG. 4. Assume the following values: $X_S=3.4$, $X_E=4.3$, $Z_S=47, Z_E=106$. Thus, we have the not uncommon condition $X_E-X_S<1$, $Z_E-Z_S>>1$. Such a condition is ripe for overflow of the divider.

It can be seen in FIG. 4 that when $X_E-X_S<1$, the following equations hold for $Z'_4$, the value to be interpolated (note that the prime notation is used to distinguish the interpolated values for lines of large slope from interpolated values for lines of ordinary slope):

$$\begin{aligned} Z'_4 &= Z_S + f_S m \\ &= Z_S + f_S \frac{(Z_E - Z_S)}{f_S + f_E} \\ &= Z_S + \frac{Z_E - Z_S}{1 + (f_E/f_S)} \end{aligned}$$

For $f_S=4-X_S=0.6$, $f_E=X_E-4=0.3$ ($f_S$ and $f_E$ are the respective components of $X_E-X_S$ on either side of the X value of the point whose corresponding Z value is being interpolated) $Z'_4$ is given by:

$$Z'_4 = 47 + \frac{(106-47)}{1+0.3/0.6} = 86.333\ldots$$

Contrast this value of $Z'_4$ with the value that would have been computed by the above-described prior art method, and one sees the great improvement provided by the present invention (the prior art method would set $Z_4=Z_S=47$). In addition, the inventive method eliminates the risk of divider overflow since the slope m is not directly involved in the computation.

Figure 5:
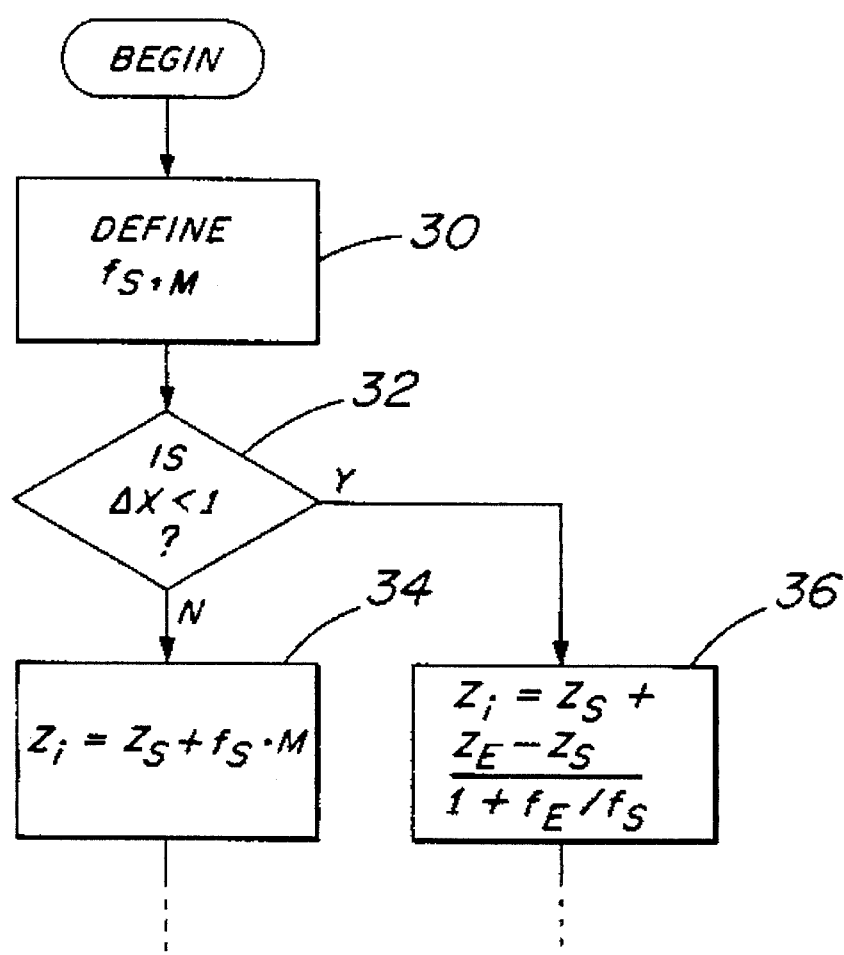
FIG. 5 is a flowchart of the interpolation method provided by the present invention.

Referring now to FIG. 5, an interpolation method in accordance with the present invention comprises the following steps. First, a fractional starting value ($f_S$) is defined, step 30. $f_S$ is most preferably equal to the difference between $X_S$ and the first integer value larger than $f_S$. Next, a determination is made of whether $\Delta X=X_E-X_S$ is less than 1 (which indicates that the slope (m) may be large), step 32. $Z_i$ is then computed in accordance with one of the following equations: For small slope, step 34 is executed and $Z_i$ is computed as, $Z_i=Z_S+f_S m$, where $m=(Z_E-Z_S)/(X_E-X_S)$. If the slope is large, step 36 is executed and $Z'_i$ is computed as $Z'_i=Z_S+(Z_E-Z_S)/(1+f_E/f_S)$, where $f_E$ defines a fractional ending value equal to the difference between $X_E$ and the next integer larger than $X_E$. In a most preferred embodiment of the inventive algorithm, there will only be one interpolated value $Z'_i$ between $X_S$ and $X_E$ when the slope is large, and a number of additional interpolated values $Z_{i+1}$, $Z_{i+2}$, etc., when the slope is small. These additional interpolated values are computed as, $Z_j=Z_{j-1}+f_S m$, where $j=i+1, i+2$, etc.

It is noted that the invention is not limited to any particular type of divider (i.e., 32-bit, 33-bit, etc.), or to the specific components depicted in FIG. 1. Moreover, many obvious variations and modifications of the above-described method and apparatus will be apparent to those skilled in the art. Accordingly, the invention is intended to be limited only by the following claims.

What is claimed is:

1. A computer graphics system, comprising:
   (a) an image creation system for generating lines to be displayed;
   (b) a frame buffer, coupled to said image creation system, for storing pixel values representative of said lines to be displayed;
   (c) a display, coupled to said frame buffer, for displaying said pixel values;
   (d) an interpolator for interpolating an ordinate value $Z_i$, along a first axis Z, intermediate between a starting ordinate value $Z_S$ and an ending ordinate value $Z_E$, said starting and ending ordinate values corresponding to starting and ending ordinate values $X_S$, $X_E$ respectively along a second axis X perpendicular to said first axis, said starting ordinate values and ending ordinate values defining starting and ending coordinates, respectively, of a line of slope m to be displayed, the interpolator comprising:
   (i) means for defining a fractional starting value $f_S$ equal to the difference between $X_S$ and a first integer value;
   (ii) means for determining whether said slope is less than a first prescribed value, said slope being defined as "large" if said slope is greater than said first prescribed value and "small" if said slope is less than or equal to said first prescribed value; and
   (iii) means for computing $Z_i$ in accordance with one of the following equations:
      (1) for a line of small slope, $Z_i=Z_S+f_S m$, wherein m is proportional to $(Z_E-Z_S)/(X_E-X_S)$, or
      (2) for a line of large slope, $Z_i=Z_S+(Z_E-Z_S)/(1+f_E/f_S)$,
   wherein $f_E$ defines a fractional ending value equal to the difference between $X_E$ and a second integer value; and
   (e) a buffer for storing said interpolated value $Z_i$.

2. The computer graphics system recited in claim 1, wherein said fractional starting value is equal to the difference between $X_S$ and the nearest integer larger than $X_S$.

3. The computer graphics system recited in claim 2, further comprising means for determining whether $X_E-X_S$ is less than 1.

4. The computer graphics system recited in claim 3, further comprising comparing means for comparing said interpolated value $Z_i$ with a value stored in said buffer, and means responsive to said comparing means for replacing said stored value with said interpolated value.

5. The computer graphics system recited in claim 4, wherein said display is a raster scan display.

6. The computer graphics system recited in claim 5, further comprising interaction means, coupled to said image creation system, for interactively altering the display of said pixels on said display.

* * * * *